INVENTOR

Hans Porepp

Aug. 19, 1969      H. POREPP      3,461,486
APPARATUS FOR MAKING A CONTINUOUS ROW OF SLIDE-FASTENER
LINKS FROM A PLASTIC THREAD
Filed Oct. 27, 1966     3 Sheets-Sheet 2
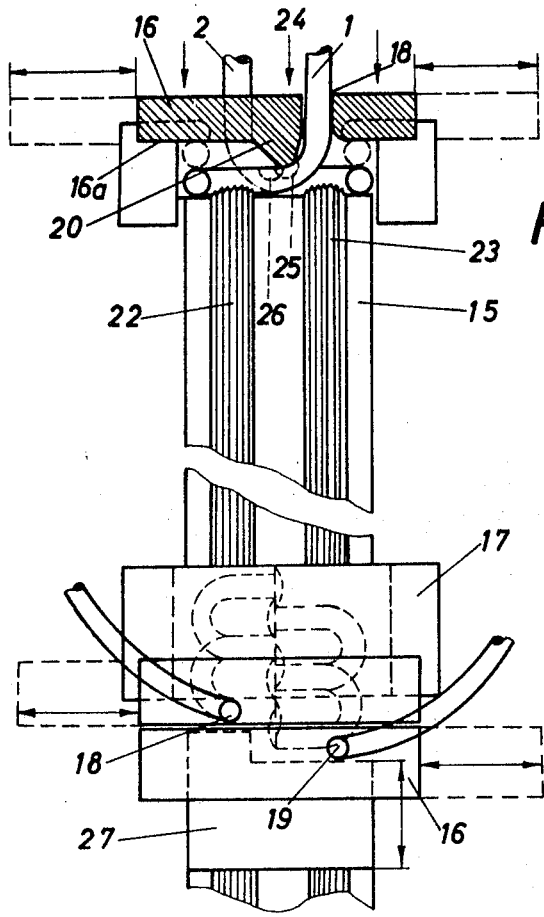
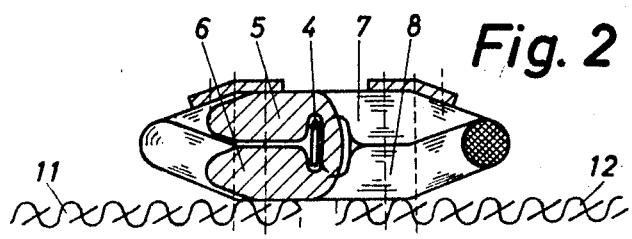
INVENTOR
Hans Porepp
Karl J. Ross
Attorney Aug. 19, 1969  H. POREPP  3,461,486
APPARATUS FOR MAKING A CONTINUOUS ROW OF SLIDE-FASTENER LINKS FROM A PLASTIC THREAD Filed Oct. 27, 1966  3 Sheets-Sheet 3

INVENTOR
Hans Porepp
Karl G. Ross
Attorney

United States Patent Office 3,461,486
Patented Aug. 19, 1969

3,461,486
APPARATUS FOR MAKING A CONTINUOUS ROW OF SLIDE-FASTENER LINKS FROM A PLASTIC THREAD
Hans Porepp, Am Rebberg, Wangen (Bodensee), Germany
Filed Oct. 27, 1966, Ser. No. 590,080
Int. Cl. B29d 5/00; A41h 37/06
U.S. Cl. 18—1      5 Claims

ABSTRACT OF THE DISCLOSURE

An apparatus for making interengaged coupling chains for a slide fastener, wherein a pair of mutually parallel, spaced thread guides, reciprocating synchronously and in opposite directions, are disposed in side-by-side relation above a base surface but are spaced therefrom by twice the thickness of the thread, and the thread guides have bores feeding the threads toward one another and the base surface while a coining cam compresses the thread against the base to form heads on the coupling elements; a slide advances the interengaged coupling lengths.

---

Figure 1:
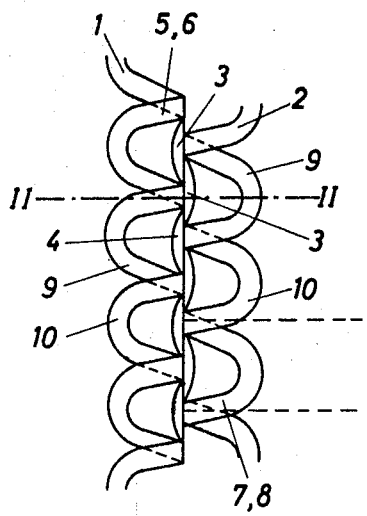

The invention relates to an apparatus for making slide-fastener chains for a slide fastener, the two halves of which may be sewed to a support tape or stringer, each consists of a series of coupling links made of a plastic material thread laid in the configuration of a deformed helical spring the convolution portions of which extending from the coupling surfaces being disposed in superposed relation in planes perpendicular to the longitudinal direction of the slide fastener.

Slide fasteners with series of coupling links made of a thread of plastic material in form of deformed helical springs are known, in which the coupling surfaces of one series of links together with the convolution portions, which merge therewith, form loops for the engagement of the coupling surfaces of the other series of links, wherein the winding portions merging with the higher loop are disposed in superposed relation in planes perpendicular to the longitudinal direction of the slide fastener, while the convolution portions having the full pitch and being disposed opposite to the coupling surfaces extend tile-like (i.e. overlappingly) one over the other.

The object of the invention is to provide an apparatus for making a slide-fastener coupling element or a series of coupling links, in which the entire width of the series of coupling links is kept evenly as flat as possible and having a height which at no point exceeds the double thickness of the thread, thus assuring an extremely rigid coupling engagement.

Accordingly the invention resides in that, in a slide fastener as described above, the convolution portions extending from the coupling surfaces initially lie snugly together one above the other, then merge opposite to the coupling surfaces into opposed return bends, and that the coupling surfaces together with the convolution portions extending therefrom and contacting each other form ears disposed within the height of the two contacting convolution portions and serving as engagement means for the coupling surfaces of the second series of coupling links of the slide fastener. Thus the height of the series of coupling links of the slide fastener fixed to a carrier ribbon in no case exceeds the double thickness of the plastic material thread used for its manufacture, and, since the coupling surfaces formed by coining flat ears and sharply kinking the same, are disposed within the zone of the height of the double thickness of thread, the coupling surfaces of the other series of coupling links engage with full surface contact behind the ears, whereby the safety against tearing-open is improved substantially.

The slide fastener can be manufactured in a particularly simple manner wherein, according to the method of the invention, the procedure is such that two threads of plastic material are guided in one plane while being deflected side-by-side in opposite directions by thread guides along a base and are, after complete overlapping of the overlapping thread portions, provided in staggered relation with coupling surfaces by coining, whereupon the threads are sharply kinked at the coupling surfaces engaging behind each other above the approaching thread extension, and are guided back in contacting engagement thereto, wherein the two convolution portions of the two series of coupling links, which are coupled by the engaging coupling surfaces are shifted forwardly about one pitch of the helical coil and are stabilized in their positions by applying heat.

The device used for this is also extremely simple and is characterized in that two oppositely reciprocating thread guides are guided side-by-side above a base surface in a spaced relation thereto corresponding to the double thickness of the thread, the thread guides each being provided with a throughgoing bore at the adjacent edges for feeding the thread to the base surface; behind each of the thread guides, with respect to the forward movement of the thread guides, is provided a coining cam, corresponding in height to one thread thickness is provided and directed against the base, the coining cam being arranged at the underside of the thread guides is pressable against the base at the end of the forward movement. A slide is provided on the base and operates transversely to the thread guides for pushing the convolution portions of the two series of coupling links of the slide fastener, which engage one another, always one pitch spacing into a heated stabilizing channel provided at the other side of the thread guides.

Figure 3:
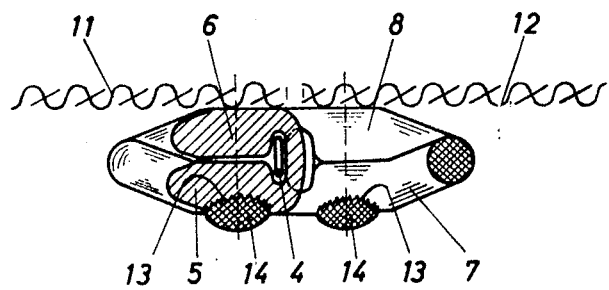
Figure 5:
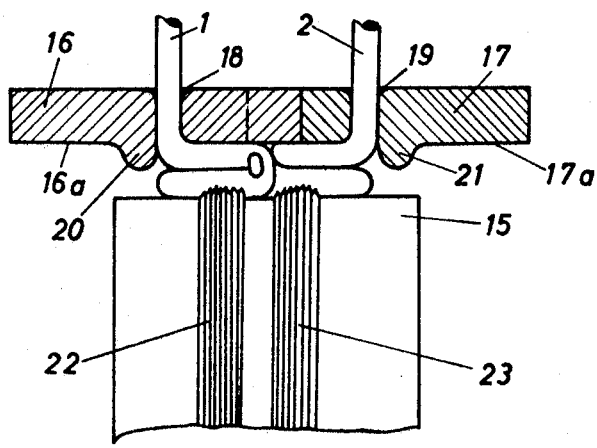

The slide fastener according to the invention as well as the method and the device for making the same will now be described in connection with the accompanying drawing, in which:

FIG. 1 is a top view of the two series of coupling links of a slide fastener according to the invention in coupling engagement in an enlarged scale;

FIG. 2 a cross-sectional view along line II—II of FIG. 1 but to a larger scale than FIG. 1;

FIG. 3 a cross-sectional view corresponding to FIG. 2 but of a modified embodiment of the coupling links;

FIG. 4 a cross-sectional view of the device with thread guides and a top view of the base below the thread guides;

FIG. 5 a cross-sectional view corresponding to FIG. 4 in which the thread guides are in their extreme outward positions;

FIG. 6 a top view of the thread guides with the advancing device; and

Figure 7:
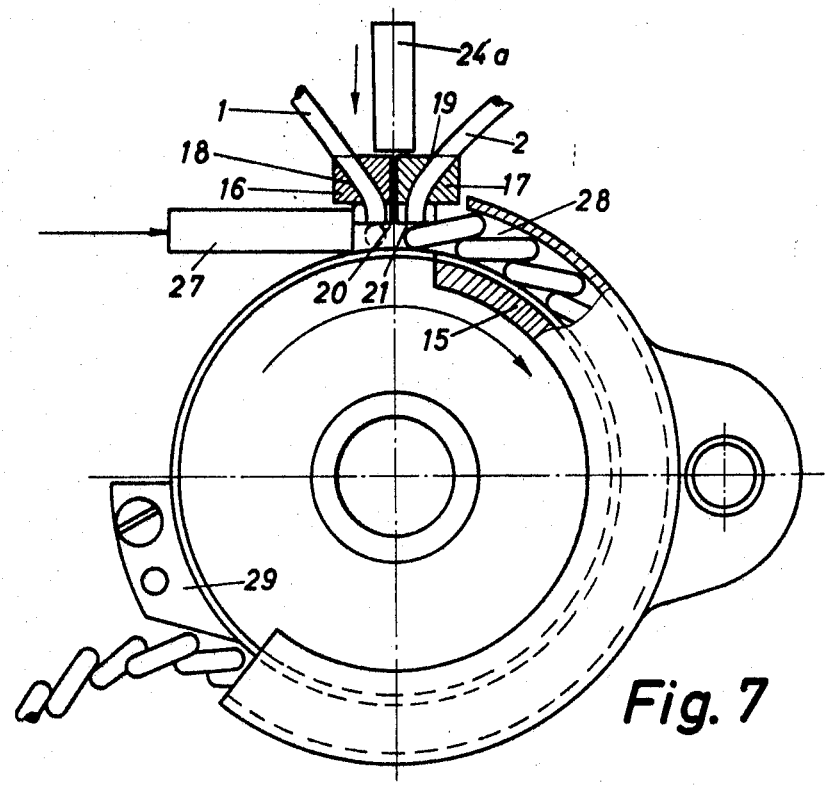

FIG. 7 a side view of the complete device partly in section for making the coupled series of coupling links.

The two series of coupling links of a slide fastener consist each of a plastic thread 1 and 2 shaped to a deformed helical spring, wherein the convolution portions 5, 6 and 7, 8 of both series of coupling links extending outwardly from the coupling surfaces 3 and 4 are disposed in superposed relation snugly contacting each other, merging opposite to the coupling surfaces 3, 4 into oppositely directed exposed return bends 9, 10. This shape of the convolution portions permits continuous manufacture, as will be explained later. The coined coupling surfaces 3 and 4, which are flattened widenings of the thread, form, with the convolution portions 5, 6 and 7, 8 (which extend therefrom in contacting engagement), by sharp kinks of the coupling surfaces, loops disposed within the height of the two contacting convolution portions, into which loop the coupling surfaces of the other series of links engage; thus the height of the slide fastener above the carrier ribbon does not exceed the double thickness of the thread. The projecting portions of the coupling surfaces formed by flattening of the thread completely engage in abutting relation in the loops, whereby an extremely secure connection with perfect safety against tearing-open is achieved.

The pair of coupling elements or chains of the slide fastener are attached in the usual manner respective support tapes or carrier ribbons, for example by sewing; as shown in FIG. 2, a narrow cover ribbon 50 may be provided as ironing protection, or it is also possible, according to FIG. 3, to provide the outer side of the convolutions facing away from the carrier ribbon with a longitudinally extending groove or recess 13 in which a string 14, or the like, is placed and sewn together with the series of coupling links to the carrier ribbon, thereby forming an ironing protection. By means of this groove 13 the string 14 and also the series of coupling links are prevented from shifting laterally. This security may yet be improved in that longitudinally and/or transversely extending serrations are provided in the groove 13, as shown in FIG. 3.

The slide fastener shown in FIGS. 1 to 3 may be manufactured in a particularly simple manner which shall be described subsequently in connection with the device shown schematically in FIGS. 4 to 7.

The device consists of a base surface which, in the exemplified embodiment, is formed by the circumferential surface of a small roller or a cylinder 15. This cylinder is journalled to rotate freely about its axis. At one circumferential location two thread guides 16 and 17, arranged side-by-side, are guided axially in parallel relation and are driven reciprocatingly in opposite directions in correspondence with the width of the series of coupling links to be manufactured. The underside 16a and 17a of the pair of thread guides 16, 17 is spaced from the circumference of the cylinder 15 by a distance equal or substantially equal to the double thickness of the plastic material threads 1, 2 to be used. Directly adjacent the abutting side surfaces the thread guides 16 and 17 are provided with a throughgoing bore 18 and 19 for the passage of the threads 1 and 2 which are directed toward the cylinder 15. With relation to the forward movement of the thread guides, in which the throughgoing bores 18 and 19 approach one another, there is provided at the underside behind and adjust the bores 18 and 19 a respective coining projection 20 or 21; the latter are directed against the circumference of the cylinder and project from the underside 16a, 17a by a distance corresponding to the thickness of the plastic material threads. The cylinder is preferably provided with two parallel annular beads 22 and 23 spaced a predetermined distance from each other and preferably provided at their outer surfaces with longitudinally extending serrations.

The production of the pair of series of coupling links of the slide fastener which engage one another, according to FIGS. 1 to 3, is as follows:

The synthetic-resin threads 1 and 2 fed from a supply roll and running over thread tighteners or tensioning devices, not shown, traverse the bores 18 and 19 and are located opposite the circumferential portions of the cylinder 15 at the outer sides of the beads 22, 23. The thread guides are then moved by a suitable drive in a direction towards each other, while the plastic threads are pulled through the bores; the coining projections 20 and 21 urge the threads against the circumferential surface of the cylinder 15, as shown in FIG. 4. The thread guides 16 and 17 then move towards each other, so far that the guide bores 18 and 19 overlap the threads 1, 2 on the base 15. At this moment the thread guides 16 and 17 press against the circumference of the cylinder 15 in the direction indicated via the arrow 24, for example by a cam drive 24a, as shown in FIG. 7, and thereby produce deformations or widenings of the thread, according to FIG. 7 forming the coupling surfaces. Subsequent to this coining operation the thread guides 16 and 17 return to their initial positions, whereby the threads 1 and 2 are sharply kinked at the deformations 25 and 26 by the rounded bore edges disposed opposite the coining projections 20 and 21 and the under-surfaces 16a and 17a of the two thread guides, whereby the deformations of the two threads mutually engage as the threads 1 and 2 are laid down during the forward movement in direct contacting engagement. Thus, it is achieved that the two series of coupling links have a height which under no circumstances is higher than twice the thickness of a thread. This extreme position of the thread guide is shown in FIG. 5. It is to be noted that, during the forward movement of the thread guides, the coining projections 20 and 21 are urging the thread tightly against the circumference of the cylinder 15. Due to this pressure and the provision of the serrated annular beads 22, 23 the longitudinally extending grooves or recesses 13 receiving the strings 14 are formed in the parts of the convolutions of the thread disposed below, as mentioned in connection with FIG. 3.

As soon as the two thread guides move back out of the position shown in FIG. 4 to the position shown in FIG. 5 a slide 27 is actuated; this slide is guided tangentially with respect to the circumference of the cylinder 15 between its circumference and the thread guides. This slide is, as shown in FIG. 6, stepped at the front side corresponding to the shifted position of the two superposed convolution portions of the two series of coupling links, and pushes the convoluted portions forwardly through a distance equal to one pitch spacing of the series of coupling links; the freely rotating cylinder 15 is similarly entrained, and the plastic threads 1 and 2 are pulled through the guide bores 18 and 19, whereby the arcuate shape of the coupling links is achieved, as shown in FIG. 1. Upon renewed forward movement of the thread guides the slide 27 moves backwardly correspondingly (via reciprocating slide movement which is continuously but with varying speed regulated by a corresponding control), so as to achieve the arcuate shape of the individual coupling links. Then the several successive operations are repeated.

The slide 27 pushes the formed coupling links, which engage one another into a directly connected channel 28 surrounding the cylinder 15 in parallel relation, and having a cross-sectional shape adapted to that of the series of coupling links interengaging each other. Within this channel 28 the coupling elements are subjected to a heat treatment, so as to remove the inner stresses caused by the shaping of the coupling links and to stabilize them. Finally the series of coupling links, which interengage arrive at the outlet of the channel and are lifted from the cylinder by a wedge 29, and are then attached to carrier ribbons in a known manner. As mentioned earlier the freely rotatably journalled cylinder 15 rotates at each advance of the slide 27 with the interengaged series of coupling links about one pitch spacing, so that the interengaged series of coupling links engage the cylinder 15 without friction, so that only the friction on the outer channel walls must be overcome upon the passage through the channel 28.

What I claim:

1. A device for making interengaging series of coupling links for a slide fastener, characterized in that two oppositely reciprocating thread guides are guidedly supported side-by-side above a base surface in spaced relation thereto corresponding to the double thickness of the thread, said thread guides being provided with a through bore at the adjacent edges for feeding the thread to the base surface, and that behind each of the thread guides, with respect to the forward movement of the thread guides, a coining cam, corresponding in height to one thread thickness is provided and directed against the base, the coining cam being arranged at the underside of the thread guides is pressible against the base at the end of the forward movement, and that a slide is provided on the base operating transversely to the thread guides for pushing the convolution portions of the two series of coupling links of the slide fastener, which are engaging each other, always one pitch spacing into a heated stabilizing channel provided at the other side of the thread guides.

2. A device according to claim 1, characterized in that the front face of said slide is stepped in accordance with the step formed by the interengaging convolution portions of said pair of series of coupling links.

3. A device according to claim 1, characterized in that said base is formed by a cylinder with a circumferential surface extending in parallel relation to its axis said cylinder being journaled freely rotatably.

4. A device according to claim 3, characterized in that two annular beads are provided extending in spaced parallel relation around the circumference of the cylinder, said beads being disposed, with relation to the reciprocatingly guided plastic material threads, between coupling surfaces and the free outer return bends of the laid threads.

5. A device according to claim 1, characterized in that said slide is moving forwardly continuously with increasing speed transversely to said thread guides when the latter are moving backwardly and are then upon forward movement of said thread guides moving backwardly continuously with decreasing speed.

References Cited

UNITED STATES PATENTS

| | | | |
|---|---|---|---|
| 2,974,372 | 3/1961 | Yoshida | 29—410 X |
| 3,054,149 | 9/1962 | Streicher | 18—1 X |
| 3,229,362 | 1/1966 | Yoshida | 29—410 |
| 3,353,217 | 11/1967 | Bashover | 18—1 X |

WILBUR L. McBAY, Primary Examiner

U.S. Cl. X.R.

29—33.2, 410

UNITED STATES PATENT OFFICE
CERTIFICATE OF CORRECTION

Patent No. 3,461,486                                August 19, 1969

Hans Porepp

It is certified that error appears in the above identified patent and that said Letters Patent are hereby corrected as shown below:

In the heading to the printed specification, after line 7, insert -- Claims priority, application Germany, November 4, 1965, P 12 80 609.6 --.

Signed and sealed this 18th day of November 1969.

(SEAL)
Attest:

Edward M. Fletcher, Jr.                         WILLIAM E. SCHUYLER, JR.
Attesting Officer                                           Commissioner of Patents